United States Patent [19]

Sakuma et al.

[11] Patent Number: 4,957,345

[45] Date of Patent: Sep. 18, 1990

[54] LIGHT ENERGY TRANSMITTING OPTICAL FIBER CABLE

[75] Inventors: Yoichi Sakuma, Kawasaki; Chieko Umezawa, Yokohama, both of Japan

[73] Assignee: Asahi Glass Company Ltd., Tokyo, Japan

[21] Appl. No.: 404,632

[22] Filed: Sep. 8, 1989

[30] Foreign Application Priority Data

Sep. 30, 1988 [JP] Japan .......................... 63-127089[U]
Apr. 27, 1989 [JP] Japan .............................. 1-48847[U]

[51] Int. Cl.$^5$ ............................................. G02B 6/44
[52] U.S. Cl. ................................................ 350/96.23
[58] Field of Search ........................... 350/96.23, 96.3

[56] References Cited

U.S. PATENT DOCUMENTS

| | | | |
|---|---|---|---|
| 4,575,184 | 3/1986 | Ueno et al. | 350/96.23 |
| 4,679,898 | 7/1987 | Grooten | 350/96.23 |
| 4,781,433 | 11/1988 | Arroyo et al. | 350/96.23 |
| 4,804,245 | 2/1989 | Katayose et al. | 350/96.23 |
| 4,807,962 | 2/1989 | Arroyo et al. | 350/96.23 |
| 4,852,965 | 8/1989 | Mullin et al. | 350/96.23 |

FOREIGN PATENT DOCUMENTS

| | | | |
|---|---|---|---|
| 54-36949 | 3/1979 | Japan | 350/96.23 |
| 58-102909 | 6/1983 | Japan | 350/96.23 |
| 61-80116 | 9/1984 | Japan | 350/96.23 |

*Primary Examiner*—John D. Lee
*Assistant Examiner*—John Ngo
*Attorney, Agent, or Firm*—Oblon, Spivak, McClelland, Maier & Neustadt

[57] ABSTRACT

A light energy transmitting optical fiber cable, which comprises, in its cross-sectional structure, a high tensile strength wire coated with a fire-retardent resin, as a core material, one or a plurality of resin-clad glass core optical fibers disposed around the core material, a highly heat conductive material covering the optical fibers, and a fire-retartdant resin covering the heat conductive material.

7 Claims, 1 Drawing Sheet

LIGHT ENERGY TRANSMITTING OPTICAL FIBER CABLE

The present invention relates to an optical fiber cable, particularly an optical fiber cable for transmitting a high level of light energy.

An optical fiber cable having a structure such that one or more optical fibers prepared by coating optically transparent cores with a clad having a refractive index lower than that of the cores, are employed, and with an intermediate material interposed, a resin is coated on the optical fibers for their protection, has been known for communication purposes.

On the other hand, in optical fibers used for energy transmission, for example, in low temperature high luminescence illuminating apparatus or in ultraviolet light irradiating apparatus, silica glass or multicomponent glass has been used as the core material or as the clad material. The optical fibers made of silica glass are effective in that they have excellent transmittance within a wide wavelength range, but they have such problems that they are expensive and inferior in the mechanical properties, for example, the clad is susceptible to damage. On the other hand, those made of multi-component glass have merits in that they are inexpensive and easy to handle, but they have a drawback that the attenuation of light is substantial and they are not suitable except for a short distance transmission.

To overcome such problems, a plastic-clad silica glass optical fiber has been developed, and a cable made thereof is practically used as a light guide for a solar energy collecting apparatus. However, such a conventional cable has a structure in which a flammable polyethylene or polyester tape is used in the interior of the cable, and thus has a problem such that when the optical fiber is broken or damaged, the broken or damaged portion generates heat during the energy transmission and in an extreme case, causes a smoke or fire.

It is an object of the present invention to solve the above-mentioned problems when an optical fiber cable is used particularly for the purpose of high density energy transmission.

The present invention provides a light energy transmitting optical fiber cable, which comprises, in its cross-sectional structure, a high tensile strength wire coated with a fire-retardant resin, as a core material, one or a plurality of resin-clad glass core optical fibers disposed around the core material, a highly heat conductive material covering the optical fibers, and a fire-retardant resin covering the heat conductive material.

Now, the present invention will be described in detail with reference to the preferred embodiments. In the accompanying drawings.

Figure 1:
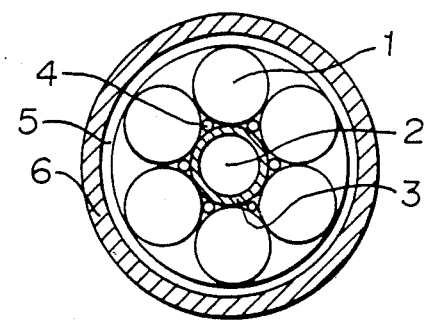
FIG. 1 is a cross sectional view of one embodiment of the present invention taken along a plane perpendicular to the axis of the high tensile strength wire core material.

In the present invention, as the core material for the cable i.e. the tensile strength wire, it is preferred to employ FRP (fiber reinforced plastics) coated with a fire-retardant resin. One of the reasons is that when the cable is cut into a desired length, the possibility of damaging optical fibers is lower than that of the case in which metal wire is used as the high tensile strength material. As the core for each optical fiber having a core-clad structure, silica glass is preferably employed, and as the clad, a material having a refractive index lower than that of the core, such as a fluoroacrylate resin, a fluorosilicone resin, a silicone resin or glass may be selected. For the purpose of a short distance transmission, the core may be made of multi-component glass.

In the present invention, as the fire-retardant resin for coating the high tensile strength wire made of e.g. FRP and as the fire-retardant resin used as the outermost coating layer, ETFE (ethylene-tetrafluoroethylene copolymer), PTFE (polytetrafluoroethylene), a fire-retardant polyurethane or a fire-retardant polyethylene may be used.

As the highly heat conductive material, a nonflammable type is preferred, and a metal tape, tube or wire made of e.g. aluminum or copper, may be employed. A material made of carbon fibers may also be employed. Such tape, tube or wire may be used as laminated in two or more layers to improve the effects of the present invention.

Further, to adjust the outer appearance of the cable or to prevent the abrasion or breakage of the optical fibers due to the mutual contact or a damage to the optical fibers due to an external force, cotton fibers, cotton threads, cotton fabrics, etc. (in this invention, these cotton materials are referred to simply as cotton) or plastic fibers, glass fibers or inorganic fibers, or a mixture thereof may be disposed in the interior of the cable to obtain effects as a cushion material.

As the optical fiber to be used in the present invention, an optical fiber having the above-mentioned core-clad structure, or a coated optical fiber prepared by providing a coating layer on the above-mentioned optical fiber, may be used. However, from the excellence in the strength, the coated optical fiber is preferred.

The optical fibers in the cable of the present invention may take a helical form wound on the high tensile wire.

As a preferred embodiment of the present invention, at least one of the light entering end and the light outgoing end of the cable is provided with a fixing and/or connecting means to facilitate and ensure the connection of the optical fiber cable to an apparatus at the light entering end side and/or to an apparatus at the light outgoing end side.

As another preferred embodiment of the present invention, at least one of the light entering end and the light outgoing end of each optical fiber is provided with a connecting means.

The above fixing and/or connecting means also has a purpose of fixing the constituting element of the present invention such as each optical fiber, so that a proper positioning of such a constituting element along the cross section perpendicular to the axis of the high tensile core material is ensured at the terminal of the optical fiber cable of the present invention. As such a means, for example, a connector made of a metal may be employed.

In the present invention, the optical fibers are surrounded by the highly heat conductive material, and even when an optical fiber is broken in the interior of the cable and energy leaks out, the heat due to the leakage is dissipated in the longitudinal direction of the cable through the highly heat conductive material, and thus abnormal heating at the broken portion can be prevented.

Even if a high temperature condition continues incidentally, the non-flammable heat conductive material as well as all of the coating layers on FRP and optical fibers, the intermediate material present between the core material and the optical fibers and the outermost coating layer, have high fire-retardancy as compared with the conventional product, and they are hardly inflammable.

Further, in a case where a metal tape or tube is used as the highly heat conductive material, heat or moisture passed through the outermost coating layer, if any, is thereby prevented from entering into the interior of the cable, and the useful life of the cable can thus be prolonged.

Now, Examples of the present invention will be described with reference to the drawings. However, it should be understood that the present invention is by no means restricted to such Examples or to the embodiments illustrated in the drawings.

EXAMPLE 1

Figure 2:
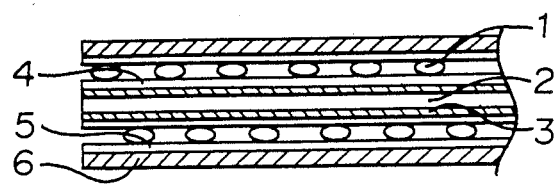
FIG. 2 is a cross sectional view of the same taken along a plane containing the axis of the core material.

FIG. 1 is a cross sectional view of one embodiment of present invention taken along a plane perpendicular to the axis of the high tensile strength core material, and FIG. 2 is a cross sectional view taken along a plane containing the axis of the core material. In these Figures, reference numeral 1 indicates a coated optical fiber, numeral 2 indicates a high tensile strength wire made of FRP, each of numerals 3 and 6 indicates a fire-retardant resin, numeral 4 indicates a fiber cushion material (cotton), and numeral 5 indicates a highly heat conductive material (aluminum tape). The coated optical fiber 1 has a spiral or helical structure wound around the high tensile strength wire 2. Therefore, the cross sectional shape of the coated optical fiber 1 in FIG. 2 is usually oval.

Fibers used in this Example comprise a core made of silica glass, a clad made of a fluoroacrylate resin and a coating on the clad being fire-retardant ETFE, wherein the core diameter is 800 $\mu$m, the clad diameter is 950 $\mu$m, and the diameter of the coated optical fiber is 1,300 $\mu$m. The core material of the cable is a wire of FRP coated with ETFE and has a diameter of 2.1 mm. Around this core material, six cotton intermediate materials were disposed, and six coated optical fibers as described above are spirally or helically wound thereon, and an aluminum tape having a width of 30 mm is wound thereon in an overlapping fashion so that one half of the width is overlapped, and a black fire-retardant polyethylene is coated thereon in a thickness of 1 mm.

The optical fiber cable obtained in this Example was cut into a length of 10 m, and a metal tubular connector was attached to each end of fibers at the light entering end of the cable and to the light outgoing end of the cable as a fixing and/or connecting means. On a fine day, this cable was attached to an automatic solar energy collecting apparatus designed to concentrate the solar energy density about 10,000 times by means of Fresnel lens, and one of the fibers was intentionally broken in the vicinity of the light outgoing end, whereby in the present Example, no change was observed even after five hours, while with a conventional product, heat generation and smoke generation were observed at the broken portion, and thus it was found that the cable of the present invention is evidently effective against localized heat generation.

Further, the optical fiber cable obtained in this Example was cut into a length of 10 m and subjected to heat and humidity test at a temperature of 90° C. under a humidity of 80% RH, whereby with the cable of the present invention, the humidity inside of the aluminum tape increased only by 10% RH, whereas with a conventional cable, the humidity inside the cable became the same value as the humidity outside the cable.

This Example is merely an embodiment of the present invention. In the present invention, the core diameter of the optical fiber may optionally be selected within a range of from about 100 to 2,000 $\mu$m, and the clad diameter and the diameter of the coated optical fiber may be optionally selected depending upon the core diameter of the optical fiber. The present invention has a wide range of applications in which a fire-retardant polyurethane, ETFE or PTFE may be used as a fire-retardant resin to coat the cable.

EXAMPLE 2

Figure 3:
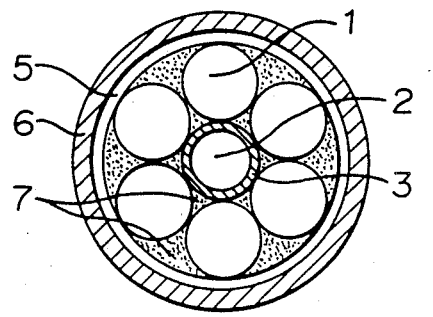
FIG. 3 is a cross sectional view of another embodiment of the present invention taken along a plane perpendicular to the axis of the core material.

A cable was prepared in the same manner as in Example 1 except that around the core material and in the space among the fibers, a cushion material 7 (cotton material) was packed. The cross sectional view of the cable is shown in FIG. 3.

In the present invention, the following effects can be obtained.

(1) A highly heat conductive material is disposed over the entire surface inside the outer coating layer of the cable, and even if an optical fiber is broken during the transmission of energy, heat will be dissipated in the longitudinal direction of the cable, so that it is possible to prevent local high temperature rise, smoke generation or catching a fire.

(2) The entire cable is constituted by fire retardant materials, whereby the cable has high heat resistance.

(3) When a metal tape or tube is disposed as the highly heat conductive material over the entire surface inside the outer coating layer of the cable, such a tape or tube serves to prevent the entry of heat or moisture passed through the outer coating layer, if any, whereby the overall useful life of the cable can be improved.

We claim:

1. A light energy transmitting optical fiber cable, comprising in its cross-sectional structure, a high tensile strength wire coated with a fire-retardant resin, as a core material, at least one resin-clad glass core optical fiber disposed around the core material, a highly heat conductive material covering the optical fibers, and a fire-retardant resin covering the heat conductive material so that cable has high fire-retardant characteristics.

2. The light energy transmitting optical fiber cable according to claim 1, wherein the highly heat conductive material is an aluminum tape.

3. The light energy transmitting optical fiber cable according to claim 1, wherein cotton, plastic fiber, glass fiber or inorganic fiber, or a mixture thereof is present between the core material and the optical fibers.

4. The light energy transmitting optical fiber cable according to claim 1, wherein the high tensile strength wire is made of fiber reinforced plastics.

5. The light energy transmitting optical fiber cable according to claim 1, wherein at least one of the light-entering end and the light outgoing end of the optical fiber cable is provided with a fixing and connecting means.

6. The light energy transmitting optical fiber cable according to claim 1, wherein at least one of the light-entering end and the light outgoing end of each optical fiber is provided with a connecting means.

7. The light energy transmitting optical fiber cable according to claim 1, wherein the light-entering end of each optical fiber is provided with a connecting means, and the light outgoing end of the optical fiber cable is provided with a fixing and connecting means.

* * * * *